(12) United States Patent
Kearney-Fischer

(10) Patent No.: US 11,656,632 B2
(45) Date of Patent: May 23, 2023

(54) TAKEOFF/LANDING STABILITY AUGMENTATION BY ACTIVE WIND GUST SENSING

(71) Applicant: Aurora Flight Sciences Corporation, Manassas, VA (US)

(72) Inventor: Martin A. Kearney-Fischer, Manassas, VA (US)

(73) Assignee: The Boeing Company, Arlington, VA (US)

( * ) Notice: Subject to any disclaimer, the term of this patent is extended or adjusted under 35 U.S.C. 154(b) by 460 days.

(21) Appl. No.: 16/510,796

(22) Filed: Jul. 12, 2019

(65) Prior Publication Data

US 2021/0011488 A1    Jan. 14, 2021

(51) Int. Cl.
*G05D 1/04* (2006.01)
*B64C 13/16* (2006.01)
*G01P 5/24* (2006.01)
*G01S 17/95* (2006.01)
*G01W 1/04* (2006.01)
(Continued)

(52) U.S. Cl.
CPC ............. *G05D 1/046* (2013.01); *B64C 13/16* (2013.01); *G01P 5/241* (2013.01); *G01S 17/95* (2013.01); *G01W 1/04* (2013.01); *B64C 29/0033* (2013.01); *G01W 2001/003* (2013.01)

(58) Field of Classification Search
CPC ......... B64C 13/16; B64C 27/04; B64C 29/00; B64C 29/0033; B64F 1/007; B64F 1/18; G01P 5/241; G01P 17/95; G05D 1/046; G05D 1/0653; G05D 1/0858;
(Continued)

(56) References Cited

U.S. PATENT DOCUMENTS 3,966,144 A    6/1976    Gabriel
4,213,584 A    7/1980    Tefft et al.
(Continued)

OTHER PUBLICATIONS

Molnar et al., "New approach of the navigation control of small size UAVs," 19th Int'l Workshop on Robotics in Alpe-Adria-Danube Region, Budapest, Hungary, Jun. 24, 2020, pp. 125-129.
(Continued)

*Primary Examiner* — Daniel L Greene, Jr.
(74) *Attorney, Agent, or Firm* — Ostrager Chong Flaherty & Broitman, P.C.

(57) ABSTRACT

Systems and methods for enabling consistent smooth takeoffs and landings of vertical and/or short-runway takeoff and landing aircraft at sites with gusty conditions. The system includes a network of wind measurement stations deployed around the perimeter of a takeoff/landing site for spatiotemporally characterizing wind fluctuations (e.g., wind gusts) that enter a volume of airspace overlying the site, data processing means for deriving information about the fluctuations from the wind measurements, communication means for transmitting disturbance information to the aircraft, and a flight control system onboard the aircraft that is configured to use the disturbance information to control the aircraft in a manner that compensates for the fluctuations. The wind measurement units may include laser Doppler anemometers, sound detection and ranging systems or other devices capable of simultaneous spatially and temporally resolved wind measurements.

20 Claims, 6 Drawing Sheets

(51) Int. Cl.
*B64C 29/00* (2006.01)
*G01W 1/00* (2006.01)

(58) Field of Classification Search
CPC .. G08G 5/0013; G08G 5/0065; G08G 5/0069; G08G 5/02; G01W 1/04; G01W 2001/003
See application file for complete search history.

(56) References Cited

U.S. PATENT DOCUMENTS

| | | | |
|---|---|---|---|
| 4,821,981 A | 4/1989 | Gangsaas et al. | |
| 4,905,934 A | 3/1990 | Chin | |
| 5,315,297 A * | 5/1994 | Cornman | G01S 13/951 340/963 |
| 6,375,127 B1 | 4/2002 | Appa | |
| 6,766,981 B2 | 7/2004 | Volk | |
| 7,267,300 B2 | 9/2007 | Heath et al. | |
| 7,495,774 B2 * | 2/2009 | Hays | G01S 17/89 356/519 |
| 7,857,254 B2 | 12/2010 | Parks | |
| 8,509,966 B2 | 8/2013 | Coulmeau et al. | |
| 8,701,482 B2 | 4/2014 | Tsadka et al. | |
| 8,774,987 B2 | 7/2014 | Walton et al. | |
| 9,248,908 B1 | 2/2016 | Luyks | |
| 9,696,423 B2 | 7/2017 | Martin | |
| 9,728,092 B2 | 8/2017 | Poudrai et al. | |
| 10,407,179 B2 * | 9/2019 | B | G01C 23/00 |
| 10,803,758 B1 * | 10/2020 | Barr | G08G 5/0013 |
| 2003/0050746 A1 * | 3/2003 | Baiada | G08G 5/0043 701/3 |
| 2009/0005921 A1 * | 1/2009 | Wilkens, Jr. | G08G 5/0026 342/357.53 |
| 2009/0157239 A1 * | 6/2009 | Walton | G05D 1/046 701/4 |
| 2010/0026007 A1 * | 2/2010 | Bevirt | B64C 31/06 290/55 |
| 2010/0131124 A1 * | 5/2010 | Klooster | G08G 5/0052 701/1 |
| 2010/0188283 A1 * | 7/2010 | Kemkemian | G01S 13/953 342/26 B |
| 2011/0140955 A1 | 6/2011 | Tillotson et al. | |
| 2011/0172919 A1 * | 7/2011 | Inokuchi | G08G 5/0039 701/301 |
| 2014/0070538 A1 * | 3/2014 | Bowyer | G01P 5/26 290/44 |
| 2016/0001883 A1 * | 1/2016 | Sanz | B64C 39/024 244/17.23 |
| 2016/0202283 A1 * | 7/2016 | Wang | G01S 17/58 356/28 |
| 2017/0069214 A1 * | 3/2017 | Dupray | G08G 5/0013 |
| 2017/0301247 A1 * | 10/2017 | Sherry | G06N 7/005 |
| 2017/0308100 A1 * | 10/2017 | Iskrev | G05D 1/10 |
| 2018/0002004 A1 * | 1/2018 | Dekel | B64C 29/00 |
| 2018/0061243 A1 * | 3/2018 | Shloosh | G08G 5/0043 |
| 2018/0072414 A1 | 3/2018 | Cantrell et al. | |
| 2018/0113478 A1 | 4/2018 | Greenfield et al. | |
| 2018/0357909 A1 * | 12/2018 | Eyhorn | G08G 5/025 |
| 2019/0100331 A1 * | 4/2019 | Wright | B64F 1/007 |
| 2019/0144111 A1 * | 5/2019 | Apostolopoulos | B64C 39/024 701/17 |
| 2020/0122830 A1 * | 4/2020 | Anderson | B60L 50/60 |
| 2021/0016872 A1 * | 1/2021 | Inokuchi | G01P 5/26 |

OTHER PUBLICATIONS

Extended European Search Report dated Nov. 3, 2020 in European Patent Application No. 20180753.4 (European counterpart to the instant U.S. patent application), 6 pages.
Bean et al., "New Primary Standards for Air Speed Measurement at NIST," 1999 NCSL Workshop and Symposium, pp. 413-421.
European Examination Report dated Oct. 22, 2021, in European Patent Application No. 20180753.4 (European counterpart of the instant U.S patent application).
Molnar et al., "New approach of the navigation control of small size UAVs", Robotics in Alpe-Adria-Danube Region (RAAD), 2010 IEEE 19th International Workshop on IEEE, Piscataway, NJ, USA, Jun. 24, 2010, pp. 125-129.

* cited by examiner

TAKEOFF/LANDING STABILITY AUGMENTATION BY ACTIVE WIND GUST SENSING

BACKGROUND

This disclosure generally relates to systems and methods for actively controlling an aircraft encountering atmospheric disturbances in flight. In particular, this disclosure relates to systems and methods for augmenting the vertical or short runway takeoff/landing stability of an aircraft by providing wind gust alleviation.

As used herein, the term "vertical takeoff and landing (VTOL) aircraft" is an aircraft which is capable of taking off or landing vertically, including fixed-wing aircraft that can hover and take off and land vertically as well as rotorcraft and tilt-rotor aircraft. As used herein, the term "short-runway takeoff and landing (STOL) aircraft" is an aircraft which is capable of taking off or landing on short runways. Some V/STOL aircraft are capable of taking off and landing either vertically or on a short runway.

Aircraft are typically equipped with an air data inertial reference system (ADIRS) that supplies air data (airspeed, angle of attack and altitude) and inertial reference (position and attitude) information to the pilots' electronic flight instrument system displays as well as other systems on the aircraft such as the flight control system. The ADIRS includes remotely mounted air data modules (e.g., gas pressure sensors) which convert pneumatic (air pressure) information from a pitot tube or a static port into digital data which is processed to provide the pilot with an indication of the aircraft air speed. This air speed is equal and opposite to the wind speed when the aircraft is stationary.

The dynamic nature of wind gusts presents difficulties during manually controlled load alleviation because the speed and direction of wind gusts can vary rapidly. Various aircraft incorporate active control systems for mitigating the effects of wind gusts (referred to hereinafter as "gust load alleviation"). Gust load alleviation devices sense atmospheric perturbations and regulate the response of the aircraft accordingly. For example, one gust load alleviation function pitches the aircraft into a gust to minimize normal acceleration and loads. Another gust load alleviation system incorporates onboard static air data sensors to detect the onset of lateral and vertical turbulence and manipulates control surfaces such as ailerons, spoilers and elevators to counteract the turbulence.

In the context of VTOL and STOL aircraft, current gust load alleviation during takeoff and landing is a combination of: (a) restricting the locations of landing sites to areas not prone to gusty winds; and (b) aircraft operations in the few places that can tolerate being bounced around. The problem addressed by the innovative technology disclosed herein is how to consistently execute smooth vertical or short-runway takeoffs and landings at landing sites that are prone to gusty conditions (such as a helipad that is in the wind wake of buildings in an urban setting).

SUMMARY

The subject matter disclosed in some detail below is directed to systems and methods for enabling consistent smooth takeoffs and landings of aircraft at sites with gusty conditions. The system includes a network of wind measurement stations deployed around the perimeter of a takeoff/landing site for spatio-temporally characterizing wind fluctuations (e.g., wind gusts) that enter a volume of airspace overlying the site, data processing means for deriving information about the fluctuations (hereinafter "disturbance information") from the wind measurements, communication means for transmitting the disturbance information to the aircraft, and a flight control system onboard the aircraft that is configured to use the disturbance information to control the aircraft in a manner that compensates for the fluctuations during takeoff or landing. The wind measurement units may include laser Doppler anemometers, sound detection and ranging (SoDAR) systems or other devices capable of simultaneous spatially and temporally resolved wind measurements over a range of distances from wind measurement units.

In accordance with one embodiment, wind measurement units are deployed around the perimeter of a takeoff/landing site. A central processing unit combines data from the wind measurement units to create a map of the wind disturbances in a column of airspace above the takeoff/landing site. The measurement data is aggregated and distilled into disturbance information, which information is then transmitted to the aircraft. A wireless datalink facilitates the transfer of the disturbance information from the ground to the aircraft. On the aircraft, the disturbance information is provided to the flight control system. The flight controller onboard the aircraft is configured to use the disturbance information to compensate for the gusts as the gusts move through the takeoff/landing site. More specifically, the flight controller anticipates the arrival of wind gusts and adjusts its control outputs to at least partially compensate for, if not cancel, the aerodynamic forces that will be exerted on the aircraft by the wind gusts when they arrive.

The wind gust alleviation technology proposed herein enables an aircraft to: (a) hold position and attitude more accurately in gusty conditions during the critical takeoff and landing phases; and (b) provide a more comfortable ride to passengers by reducing bumpy portions of flight during takeoff and landing.

Although various embodiments of systems and methods for enabling consistent smooth takeoffs and landings of aircraft at sites with gusty conditions will be described in some detail below, one or more of those embodiments may be characterized by one or more of the following aspects.

One aspect of the subject matter disclosed in detail below is a method for augmenting takeoff and landing stability of an aircraft, the method comprising: (a) measuring wind gusts in a volume of airspace overlying a takeoff/landing zone using a multiplicity of wind measurement units, wherein the aircraft is being maneuvered vertically in the volume of airspace overlying the takeoff/landing zone having the multiplicity of wind measurement units that define a periphery of the volume of airspace; (b) converting wind gust measurements into disturbance information, using a wind measurement computer system, identifying a localized disturbance projected to encounter the aircraft; (c) transmitting the disturbance information from the wind measurement computer system to a flight controller of the aircraft; (d) generating commands for controlling the aircraft in a manner that, at least partially, counteracts an impact of the localized disturbance on the aircraft in the volume of airspace; and (e) controlling the aircraft in accordance with the commands generated in step (d).

Another aspect of the subject matter disclosed in detail below is a system for augmenting takeoff and landing stability of an aircraft in a volume of airspace overlying a takeoff/landing zone, the system comprising: a multiplicity of wind measurement units spaced along a perimeter of the takeoff/landing zone, measuring wind gusts in the volume of airspace; a wind measurement computer system configured to convert wind gust measurements into disturbance information identifying a localized disturbance projected to encounter the aircraft within the volume of airspace; and a flight controller onboard the aircraft which is communicatively coupled to the wind measurement computer system and configured for generating commands based on the disturbance information for controlling the aircraft in a manner that, at least partially, counteracts an impact of the localized disturbance on the aircraft, and then controlling the aircraft in accordance with the commands.

A further aspect of the subject matter disclosed in detail below is a method for augmenting takeoff and landing stability of an aircraft, the method comprising: (a) measuring wind gusts that form in a volume of airspace using a multiplicity of wind measurement units, wherein the aircraft is being maneuvered along a path in the volume of airspace overlying a zone adjacent a runway threshold, the volume of airspace having the multiplicity of wind measurement units that define a periphery of the volume of space; (b) converting wind gust measurements into disturbance information identifying a localized disturbance projected to encounter the aircraft along the path, using a wind measurement computer system on the ground or onboard the aircraft; (c) transmitting the disturbance information from the wind measurement computer system to a flight controller onboard the aircraft; (d) generating commands for controlling the aircraft in a manner that, at least partially, counteracts an impact of the localized disturbance on the aircraft along the path; and (e) controlling the aircraft at the predicted time of arrival in accordance with the commands generated in step (d).

Yet another aspect of the subject matter disclosed in detail below is a system for augmenting takeoff and landing stability of an aircraft in a volume of airspace overlying a zone adjacent a runway threshold, the system comprising: a multiplicity of wind measurement units spaced along a perimeter of the zone adjacent the runway threshold, measuring wind gusts in the volume of airspace; a wind measurement computer system configured to convert wind gust measurements into disturbance information identifying a localized disturbance projected to encounter the aircraft within the volume of airspace; a flight controller onboard the aircraft which is communicatively coupled to the wind measurement computer system and configured for generating commands based on the disturbance information for controlling the aircraft in a manner that, at least partially, counteract an impact of the localized disturbance on the aircraft, and then controlling the aircraft in accordance with the commands.

Other aspects of systems and methods for enabling consistent smooth takeoffs and landings of aircraft at sites with gusty conditions are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of systems and methods for enabling consistent smooth takeoffs and landings of aircraft at sites with gusty conditions are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The method for wind gust load alleviation proposed herein has application to many different types of aircraft. For the sake of illustration, two examples of types of aircraft that would benefit from the wind gust load alleviation technology disclosed herein will be briefly described.

Figure 1:
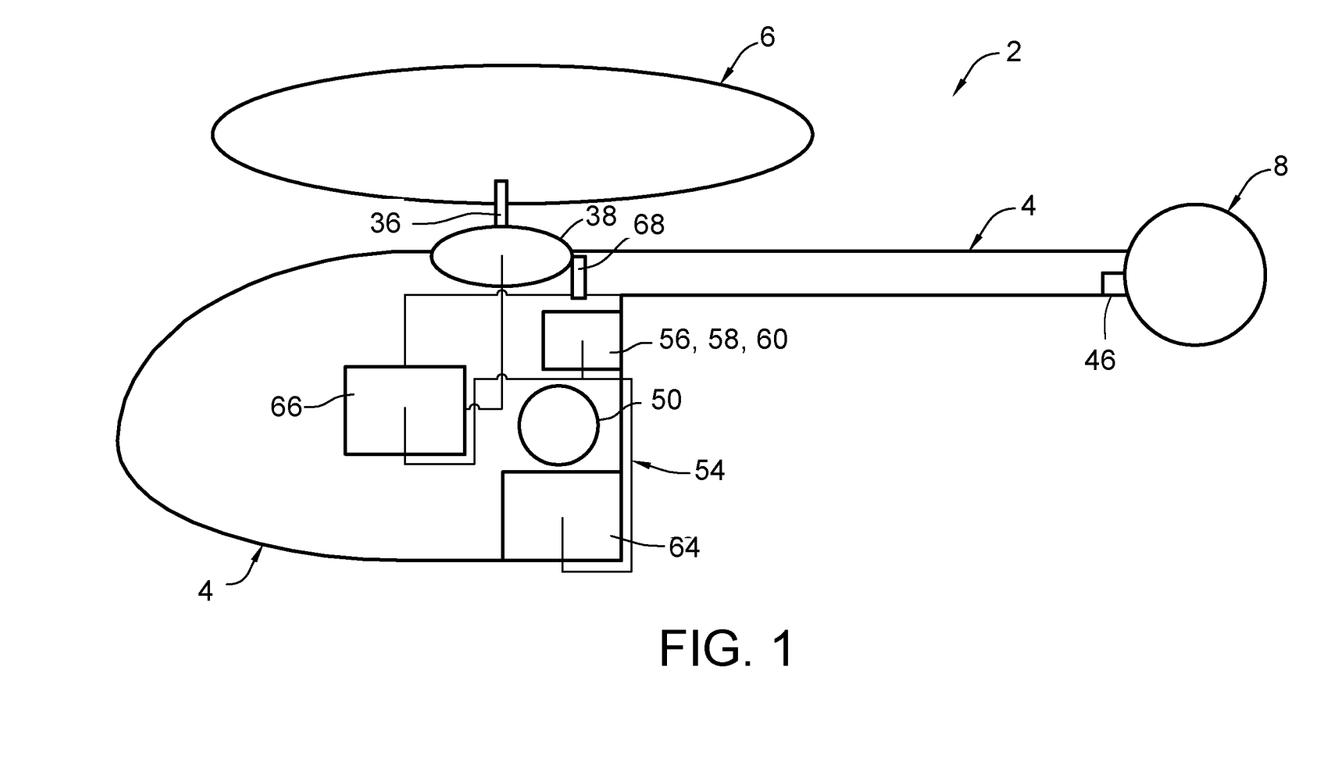
FIG. 1 is a diagram identifying components of a helicopter which is capable of vertical take-off and landing.

FIG. 1 is a diagram identifying components of a VTOL aircraft 2 which is capable of vertical take-off and landing. In this example, the VTOL aircraft 2 is a hybrid-power (diesel/electric) rotary-wing aircraft. The VTOL aircraft 2 has an airframe 4 that supports the component parts of the aircraft. The VTOL aircraft 2 includes a main rotor 6 that is rotatably coupled to the airframe 4. More specifically, the main rotor 6 includes a main rotor shaft 36 that is rotatably coupled to the airframe 4 and a plurality of main rotor blades (not shown in FIG. 2) that are mounted to the main rotor shaft 36. A tail rotor 8 is also rotatably coupled to a tail end of the airframe 4. The tail rotor 8 includes a plurality of tail rotor blades and a tail rotor shaft (not shown in FIG. 1).

The VTOL aircraft 2 further includes a main rotor electric motor 38 mounted to the airframe 12. The main rotor electric motor 38 is operatively coupled to the main rotor shaft 36. The main rotor electric motor 38 drives rotation of the main rotor 6. The VTOL aircraft 2 further includes a main rotor tilt actuator 68 which is mechanically coupled to selectively tilt the main rotor electric motor 38 and main rotor shaft 36 forward during high-speed flight to improve the aerodynamic efficiency of the airframe 12 and main rotor 6. The VTOL aircraft 2 further includes a tail rotor electric motor 46 also mounted inside the airframe 4. The tail rotor electric motor 46 is operatively connected to the tail rotor 8. Running the tail rotor electric motor 46 rotates the tail rotor 8 of the VTOL aircraft 2. The VTOL aircraft 2 further includes an electric generator 50 is mounted to the airframe 4. The electric generator 50 provides electric power to main rotor electric motor 38 and tail rotor electric motor 46 through the electrical network 54.

The VTOL aircraft 2 depicted in FIG. 1 further includes an internal combustion engine 64 (e.g., a turbocharged diesel engine) which is mounted to the airframe 4. The internal combustion engine 64 is operatively coupled to the electric generator 50. The internal combustion engine 64 drives rotation of a rotor of the electric generator 50, which converts the mechanical energy provided by internal combustion engine 64 into electrical power.

In addition, a plurality of batteries 66 (e.g., high-energy-density lithium ion batteries) are mounted to the airframe 4 of the VTOL aircraft 2. The batteries 66 are charged using electrical power provided by the electric generator 50. The batteries 66 are also electrically connected to provide backup electrical power to the main rotor electric motor 38 and tail rotor electric motor 46 in the event of diesel engine failure.

The electrical power output by the electric generator 50 is commutated, conditioned and controlled by respective pluralities of electric current inverters 56, 58 and 60. The electric current inverters 56 convert alternating current generated by electric generator 50 to direct current which is used to charge the batteries 66. The electric current inverters 58 convert direct current from the batteries 66 to alternating current which is used to power main rotor electric motor 38. The electric current inverters 60 convert direct current from the batteries 66 to alternating current which is used to power tail rotor electric motor 46.

The VTOL aircraft 2 further includes a flight control system (not shown in FIG. 2) that integrates the electric generator 50 with control laws (hereinafter "hybrid controller logic") pertaining to power settings of the internal combustion engine 64 based on system demand and current measured values of operational and environmental parameters (e.g., ambient temperature, altitude, electrical demand, diesel engine temperature and thresholds). The design operates the internal combustion engine 64 at maximum engine efficiency at any aircraft speed. The hybrid controller logic automatically varies the performance parameters of internal combustion engine 64 and main rotor motor 38 based on takeoff weight, flight conditions, performance settings, etc.

In accordance with one embodiment of the wind gust alleviation system proposed herein, the flight control system of a VTOL aircraft (such as VTOL aircraft 2 depicted in FIG. 1) is configured to enable consistent smooth takeoffs and landings at sites with gusty conditions. The wind gust alleviation system further includes a network of wind measurement stations deployed around the perimeter of the takeoff/landing site for spatio-temporally characterizing wind fluctuations (e.g., wind gusts) that enter a volume of airspace overlying the site. The wind measurements are processed to derive disturbance information which is transmitted to the VTOL aircraft.

Figure 2:
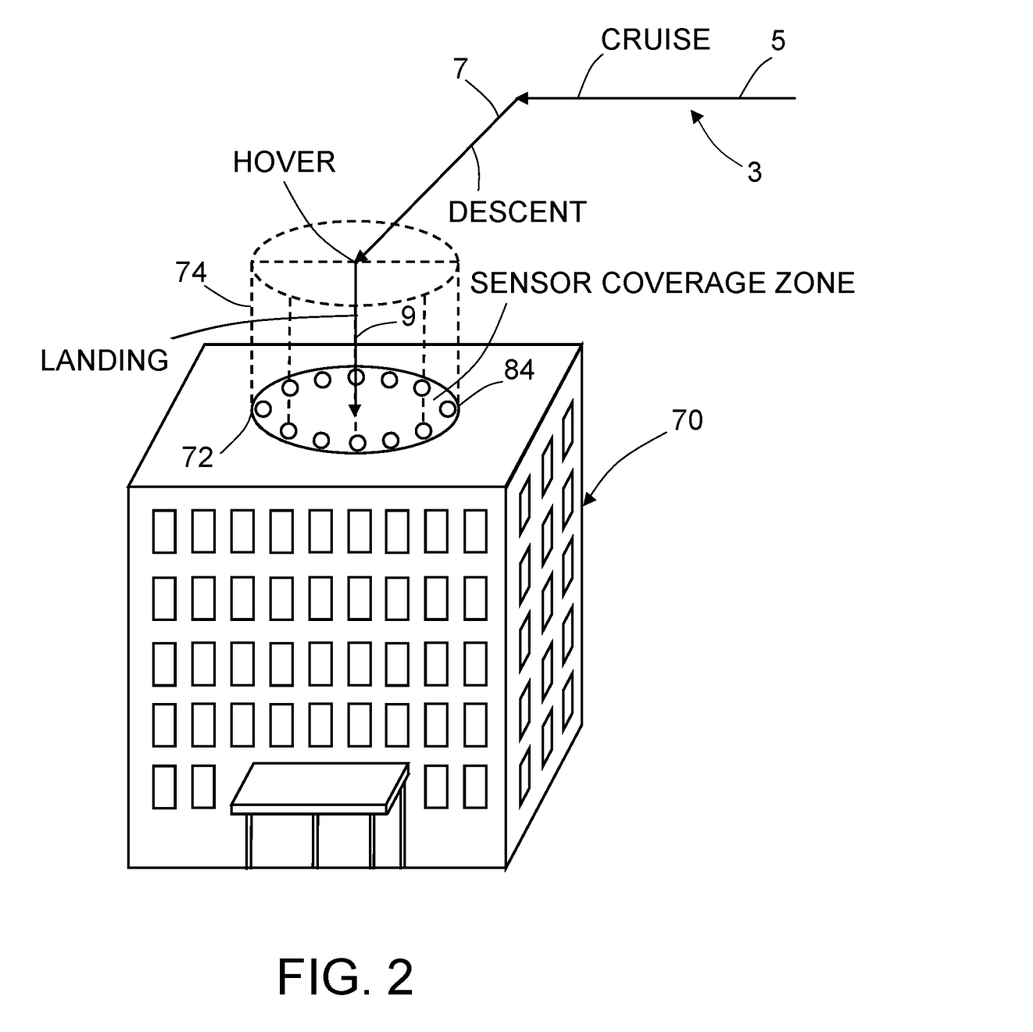
FIG. 2 is a diagram representing a three-dimensional view of a network of wind measurement units deployed along a perimeter of a helipad located on top of a building in accordance with one embodiment.

FIG. 2 is a diagram representing a three-dimensional view of a network of wind measurement units 84 deployed along a perimeter of a column of airspace above a takeoff/landing site 72 (e.g., a helipad) in accordance with one embodiment. In this example, the takeoff/landing site 72 is a helipad on top of a building 70, but the wind gust alleviation technology proposed herein is equally applicable to helipads on the ground. In cases wherein the takeoff/landing site 72 is circular (as shown in FIG. 2), the wind measurement units 84 are positioned at angular intervals along the circumference of the circle and are oriented to measure wind speed and direction along respective vertical lines projecting upward from the wind measurement units 84, thereby establishing a sensor coverage zone 74 (indicated by dashed lines in FIG. 2) encompassing a column of airspace having a height equal to the vertical range of the wind measurement units 84. Optionally, the wind measurement units 84 may be mounted on respective masts so that the wind measurement units 84 are elevated above the surface of the takeoff/landing site 72. Collectively, the wind measurement units 84 acquire data which is processed to determine the speed and direction of any wind that enters or leaves the sensor coverage zone 74 at an elevation higher than the elevation of the wind measurement unit. Of particular interest are wind gusts that will exert aerodynamic forces on the VTOL aircraft during vertical takeoff or landing.

In the example situation depicted in FIG. 2, a path 3 of a VTOL aircraft is indicated by a chain of arrows respectively representing a cruise segment 5, a descent segment 7 and a landing segment 9. The VTOL aircraft (not shown in FIG. 2) cruises along cruise segment 5 toward a position directly above a center point of the takeoff/landing site 72. At a specified distance from the takeoff/landing site, the VTOL aircraft begins to descend along cruise segment 7 toward a hover point directly above the takeoff/landing site 72. In the landing phase, the VTOL aircraft descends vertically along landing segment 9 toward the sensor coverage zone 74. Before the VTOL aircraft enters the sensor coverage zone 74, the wind measurement units 84 acquire data which is processed by a central processing unit (not shown in FIG. 2) to determine the speed and direction of the wind intersecting the sensor coverage zone 74. Any wind intersecting the sensor coverage zone 74 may produce aerodynamic forces on the VTOL aircraft as the VTOL aircraft continues downward toward the takeoff/landing site 72. The central processing unit aggregates data from the wind measurement units 84 to create a map of the wind disturbances in the column of airspace within the sensor coverage zone 74. A wireless datalink facilitates the transfer of the disturbance information from the ground to the VTOL aircraft. The flight controller onboard the VTOL aircraft then uses the disturbance information to anticipate and compensate for the gusts as the VTOL aircraft lands.

The wind measurement units 84 may include laser Doppler anemometers, sound detection and ranging (SoDAR) systems or other devices capable of simultaneous spatially and temporally resolved measurements within a range of altitudes. A laser Doppler anemometer is a device used for measuring velocity and turbulence distribution in the flow of a fluid. In laser Doppler velocimetry, laser Doppler anemometers use a beam of light from a laser that is divided into two beams, with one beam propagating out of the anemometer. Particulates flowing along with air molecules near where the beam exits reflect, or backscatter, the light back into a detector, where it is measured relative to the original laser beam. When the particles are in great motion, they produce a Doppler shift for measuring wind speed in the laser light, which is used to calculate the speed of the particles, and therefore the speed of the air around the anemometer. SoDAR is an acoustic-based remote sensing technique used extensively in the wind industry to provide detailed wind profile information by measuring the scattering of sound waves by atmospheric turbulence. SoDAR systems are used to measure wind speed at various heights above the ground. Commercially available SoDAR systems include antennas that transmit and receive acoustic signals. The horizontal components of the wind velocity are calculated from the radially measured Doppler shifts and the specified tilt angle from the vertical. The vertical range of a SoDAR system may be up to 2 km.

Figure 3:
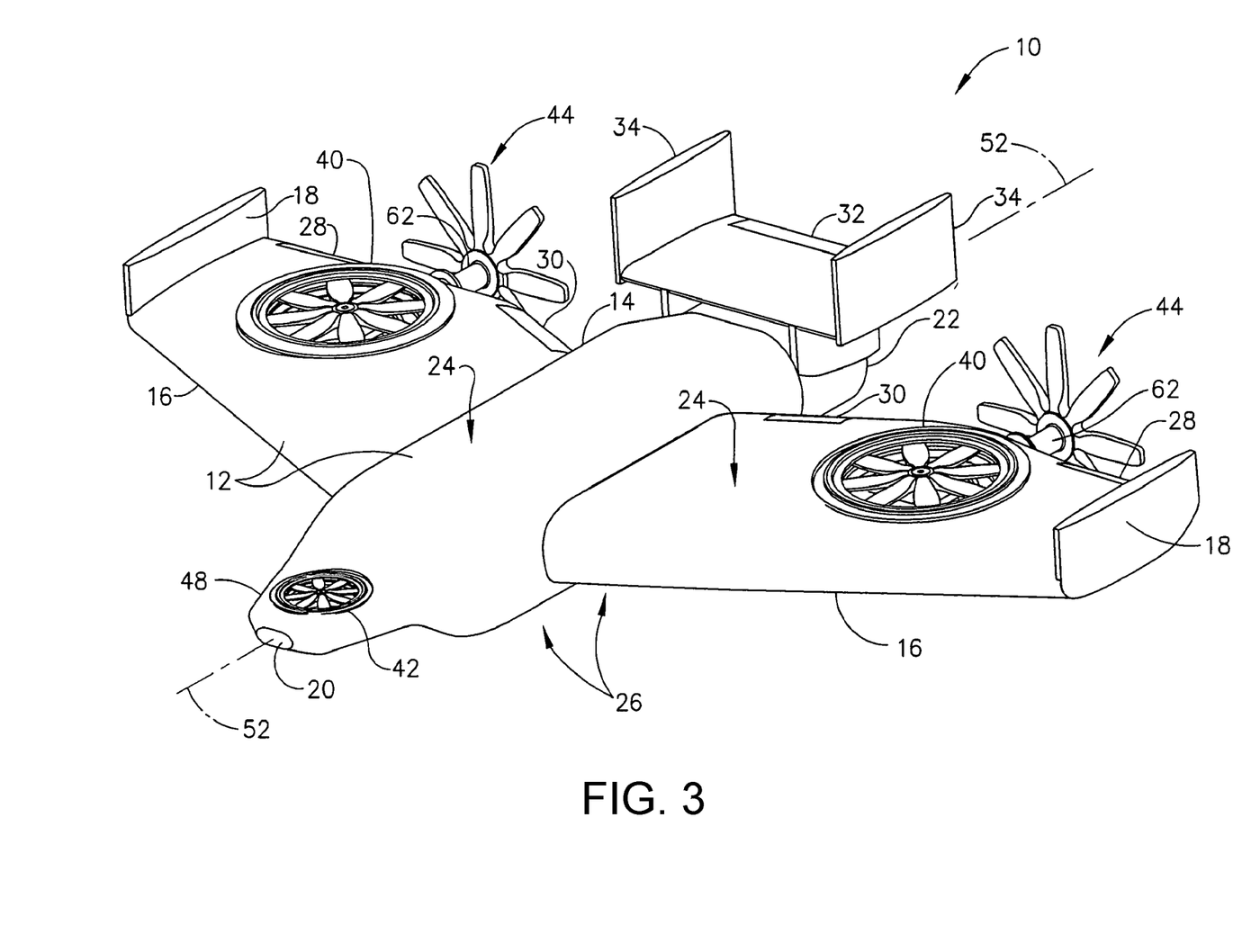
FIG. 3 is a diagram representing a three-dimensional view of an aircraft which is capable of vertical and short runway take-off and landing.

FIG. 3 is a diagram representing a three-dimensional view of a V/STOL aircraft 10 which is capable of vertical and short runway take-off and landing. The V/STOL aircraft 10 has an airframe 12 including a fuselage 14 and at least two wings 16 extending laterally from the fuselage to wingtips 18. The fuselage 14 extends along a longitudinal axis 52 between a forward end 20 and an aft end 22. The fuselage 14 and wings 16 have respective top surfaces 24 and respective bottom surfaces 26. The V/STOL aircraft 10 includes steering components such as ailerons 28, flaps 30, one or more elevators 32, and vertical stabilizers or fins 34. The V/STOL aircraft 10 further includes three counter-rotatable ducted fan sets, including two wing ducted fan sets 40 and one nose ducted fan set 42. The nose ducted fan set 42 is disposed in the aircraft nose 48 adjacent the forward end 20 of the airframe 12. The V/STOL aircraft 10 further includes two propellers 44 mounted on the airframe 12.

Although not visible in FIG. 3, the V/STOL aircraft 10 has a power plant mounted inside the aft end 22 of airframe 12. The counter-rotatable ducted fan sets 40, 42 are powered by the power plant for providing upward lift to the aircraft 10 during operation of the ducted fan sets 40, 42. The propellers 44 are powered by the power plant for moving the V/STOL aircraft 10 in a generally forward direction during operation of the propellers 44. The power plant may be any conventional type of motor or engine for producing torque, such as an internal combustion engine, a gas turbine engine, an electric motor, a hydrogen fueled engine, or a hybrid motor. As disclosed in U.S. Pat. No. 7,267,300, the power plant is operatively connected to a transfer gear box by a main torque shaft (inside airframe 12 and not visible in FIG. 3). The main torque shaft transfers torque generated in the power plant to the transfer gear box. The transfer gear box transfers torque received from the main torque shaft to the wing ducted fan sets 40 and nose ducted fan set 42 by way of wing torque shafts and a nose torque shaft respectively (not visible in FIG. 3). The propellers 44 are powered by torque received from the wing ducted fan sets 40 by way of propeller shafts 62.

Figure 4:
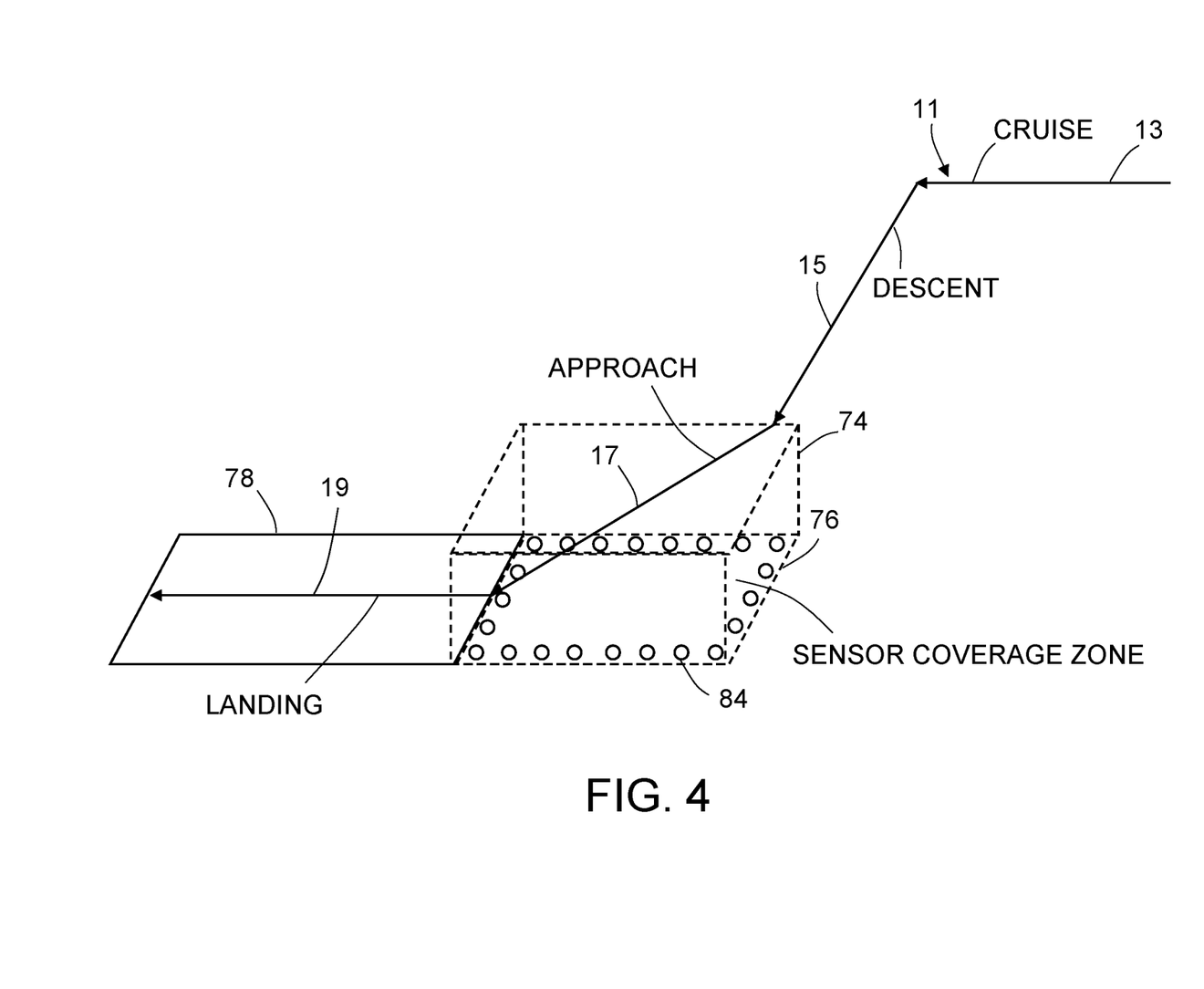
FIG. 4 is a diagram representing a three-dimensional view of a network of wind measurement units deployed along a perimeter of a runway approach zone located on the ground in accordance with another embodiment.

FIG. 4 is a diagram representing a three-dimensional view of a network of wind measurement units 84 deployed along a perimeter of a volume of airspace overlying an approach zone adjacent a runway 78 in accordance with another embodiment. In the exemplary configuration depicted in FIG. 4, the wind measurement units 84 are positioned at intervals along the sides of a rectangular approach zone 76 situated adjacent to the threshold of the runway 78. The wind measurement units 84 are oriented to measure wind speed and direction along respective vertical lines projecting upward from the wind measurement units 84, thereby establishing a sensor coverage zone 74 (indicated by dashed lines in FIG. 4) encompassing a box-shaped volume of airspace having a height equal to the vertical range of the wind measurement units 84. Collectively, the wind measurement units 84 acquire data which is processed to determine the speed and direction of any wind that enters or leaves the sensor coverage zone 74. Of particular interest are wind gusts that will exert aerodynamic forces on a V/STOL aircraft during an approach to the runway 78.

In the example situation depicted in FIG. 4, a path 13 of a V/STOL aircraft is indicated by a chain of arrows respectively representing a cruise segment 13, a descent segment 15, an approach segment 17 and a landing segment 19. The V/STOL aircraft (not shown in FIG. 4) cruises toward a position and then begins its descent while attempting to align with a centerline of the runway 78. At a specified elevation and at a specified distance from the threshold of runway 78, the V/STOL aircraft begins the approach by gliding at an angle and slowing. At a point along the glide path, the V/STOL aircraft enters the sensor coverage zone 74. Before the V/STOL aircraft enters the sensor coverage zone 74, the wind measurement units 84 acquire data which is processed by a central processing unit (not shown in FIG. 4) to determine the speed and direction of the wind intersecting the sensor coverage zone 74. Any wind intersecting the sensor coverage zone 74 may produce aerodynamic forces on the V/STOL aircraft as the V/STOL aircraft continues to approach the runway threshold. The central processing unit aggregates data from the wind measurement units 84 to create a map of the wind disturbances within the sensor coverage zone 74. A wireless datalink facilitates the transfer of the disturbance information from the ground to the V/STOL aircraft during the approach. The flight controller onboard the V/STOL aircraft then uses the disturbance information to anticipate and compensate for the gusts during the approach. The wind gust alleviation algorithm executed by the flight controller enables the V/STOL aircraft to land safely on the runway 78.

In accordance with alternative embodiments, the sensor coverage zone 74 may be expanding to include either the descent segment 15 or the landing segment 19 for the purpose of measuring wind gusts that may affect the stability of the aircraft during descent or landing. In addition, the expansion of the sensor coverage zone 74 may enable the wind measurement computer system to identify wind gusts or pressure changes immediately outside the approach zone to anticipate effects that may be experienced by the aircraft in the approach zone caused by the gusts/pressure changes in the descent zone and/or landing zone.

Figure 5:
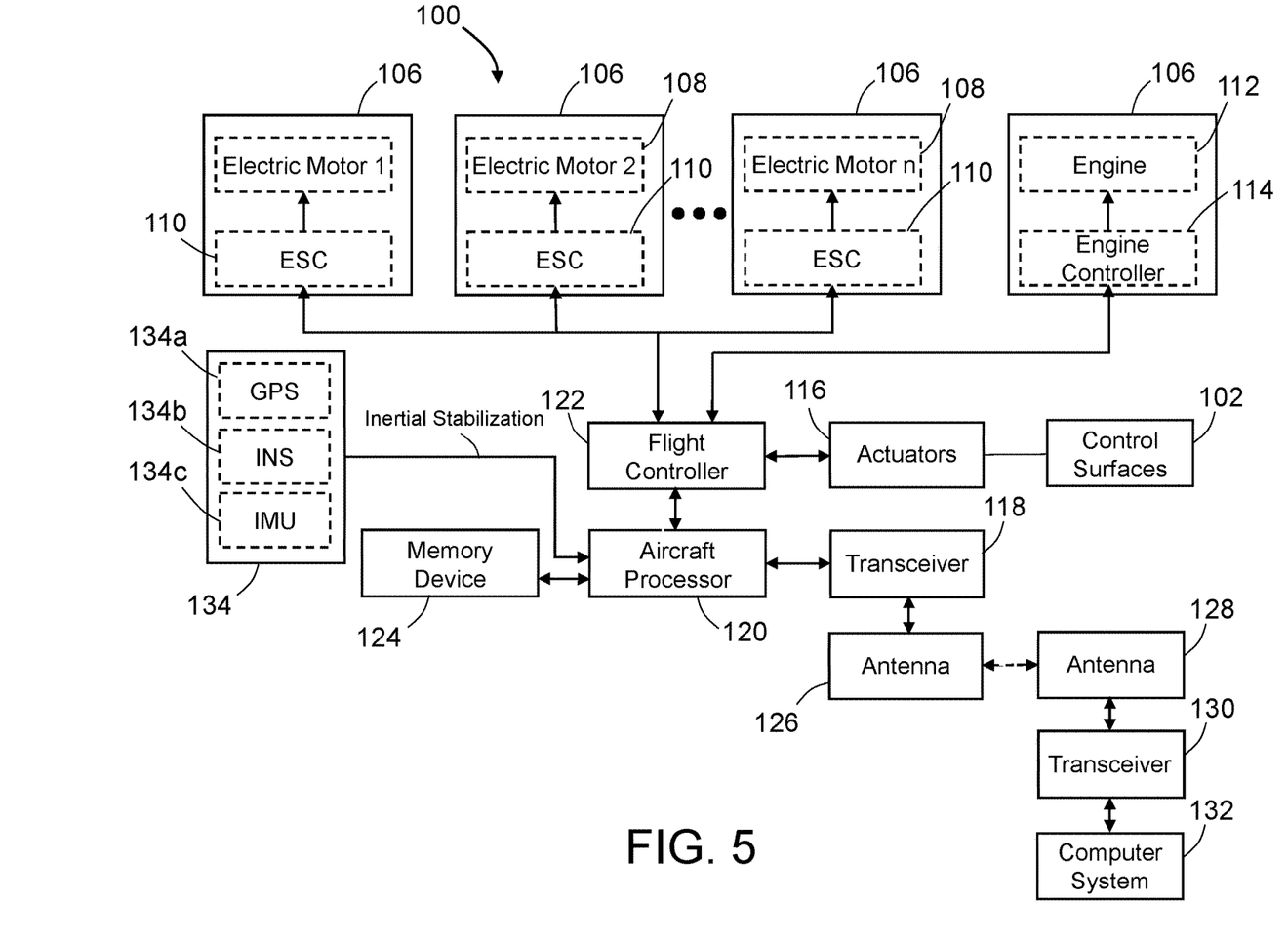
FIG. 5 is a block diagram identifying components of systems onboard a typical aircraft.

FIG. 5 is a block diagram identifying components of an example flight control system 100 of a V/STOL aircraft. The flight control system 100 may be configured to control the various components and functions of the aircraft. As illustrated, the flight control system 100 includes one or more aircraft processors 120 communicatively coupled with at least one memory device 124, a flight controller 122, a wireless transceiver 118, and a navigation system 134. The aircraft processor 120 may be configured to perform one or more operations based at least in part on instructions (e.g., software) and one or more databases stored to the memory device 124 (e.g., hard drive, flash memory, or the like). The flight controller 122 may have the configuration depicted in FIG. 6, including a position control system 88 configured to automatically execute the wind gust alleviation operations described herein upon receipt of impending disturbance information received during a takeoff or landing.

The flight control system 100 may further include other desired services, such as a wireless transceiver 118 coupled with an antenna 126 to communicate data between the flight control system 100 and an offboard wind measurement system installed on the ground or on a building. In the example scenario depicted in FIG. 5, the offboard wind measurement system includes a computer system 132 and an antenna 128 and transceiver 130 connected to enable the computer system 132 to communicate with the aircraft processor 120.

The aircraft processor 120 may be operatively coupled to the flight controller 122 to control operation of various actuators 116 (e.g., those to control movement and locking of control surfaces 102) and various mechanical power plants 106 of a propulsion system. The mechanical power plants 106 depicted in FIG. 5 include a plurality of n electric motors 108 and an engine 112. Each electric motor 108 operates under the control of a respective electronic speed controller 110 that receives commands from the flight controller 122. The electric motors 108 may be controlled by adjusting power supplied to each electric motor from a power supply (e.g., a battery pack or a battery bank) via the associated electronic speed controller 110. (An electronic speed controller is an electronic circuit that controls and regulates the speed of an electric motor. It may also provide reversing of the motor and dynamic braking.) The engine 112 operates under the control of an engine controller 114 in response to commands from the flight controller 122. The aircraft further includes propulsors (not shown in FIG. 5) which convert the mechanical power output by the mechanical power plants 106 into propulsive forces In certain aspects, the aircraft processor 120 and the flight controller 122 may be integrated into a single computer or processor. In operation, the flight controller 122 may dynamically (i.e., in real-time or near real-time) and independently adjust thrust during the various stages of flight via the electronic speed controllers 110 or engine controller 114 (as the case may be) to control roll, pitch, or yaw of the aircraft. When rotors with rotor blades (e.g., propellers) are used, the flight controller 122 may vary the revolutions per minute of a rotor and, where desired, vary the pitch of the rotor blades.

The aircraft processor 120 may be operatively coupled to the navigation system 134, which may include a global positioning system 134a (hereinafter "GPS 134a") that is communicatively coupled with an inertial navigation system 134b and/or an inertial measurement unit 134c, which can include one or more gyroscopes and accelerometers. The GPS 134a gives an absolute drift-free position value that can be used to reset the navigation solution or can be blended with the navigation solution by use of a mathematical algorithm, such as a Kalman filter. The navigation system 134 may communicate, inter alia, inertial stabilization data to the aircraft processor 120.

Figure 6:
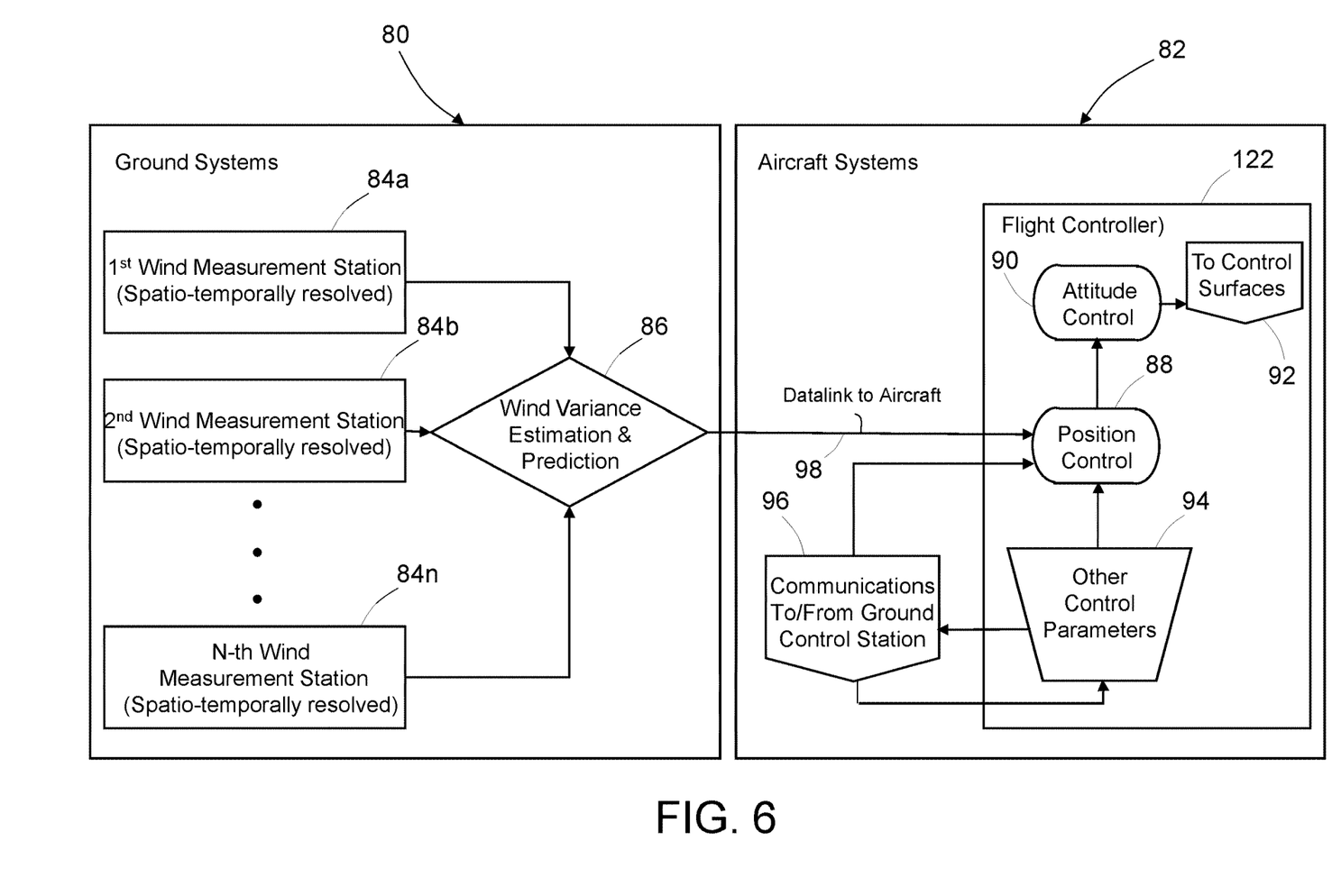
FIG. 6 is a flowchart showing the communication of signals and interaction between a ground-based wind gust alleviation system of the type proposed herein and systems onboard an aircraft.

FIG. 6 is a flowchart showing the communication of signals and interaction between a ground-based wind measurement system 80 of the type proposed herein and systems 82 onboard a V/STOL aircraft (hereinafter "aircraft systems 82"). The wind measurement system 80 includes a multiplicity of N wind measurement units 84a-84n (where n is the N-th letter in the alphabet) that measure the wind speed and direction along the perimeter of a sensor coverage zone and within a range of altitudes. The wind measurement system 80 further includes a computer system configured for processing the wind measurement data In particular, the computer system is configured to estimate a current variance and predict a future variance of the wind as a function of altitude by executing a wind variance estimation and prediction algorithm 86. The computer system of the wind measurement system 80 includes one or more communicatively coupled computers or processors configured to receive data from the wind measurement units 84a-84n and calculate the current average speed and direction of any wind entering the sensor coverage zone 74 within a range of altitudes. The averages are both spatial and temporal. The ground-based computer system combines the measurements from the wind measurement units and reduces them to disturbance information (information may include position, size, shape, velocity, etc.). The disturbance information is transmitted to a flight controller 122 onboard the aircraft via a wireless datalink 98. For example, the wireless datalink 98 may be enabled using a transceiver and antenna on the ground and a transceiver and antenna onboard the aircraft.

Still referring to FIG. 6, the flight controller 122 includes a position control system 88 comprising one or more processors or computers configured for controlling thrust, altitude, etc. The flight controller 122 further includes an attitude control system 90 that receives commands from the position control system 88. The attitude control system 90 comprises one or more processors or computers configured for controlling the orientation (pitch, roll and yaw) of the aircraft by outputting commands 92 to the various control surfaces (e.g., elevators, rudder and ailerons). The position control system 88 is configured for controlling the position and speed of the aircraft based at least in part on control parameters received via communications 96 from a ground control station (not shown in FIG. 6) and other control parameters 94 stored in non-transitory tangible computer-readable storage means incorporated in the flight controller 122.

The ground control station may be a remote pilot that is capable of sending signals to the flight controller 122 for controlling flight parameters onboard the aircraft and receiving other control parameters 94 containing information regarding aircraft status, sensor readings, etc. For example, other control parameters fed back to the ground control station in communications 96 may include aircraft state information such as altitude, fuel level, speed, etc. In addition, the ground control station may be capable of sending signals to the position control system 88 for controlling the flight path of the aircraft.

In accordance with one embodiment, the position control system 88 includes one or more processors or computers configured for predicting imminent effects of disturbances at altitudes specified in the disturbance information received from the wind measurement system 80 via the datalink 98 and then generating commands designed to control the aircraft in a manner that will at least partially compensate for (counteract) the effects of those disturbances. More specifically, a processor or computer of the position control system 88 is configured to: (a) compute the anticipated position and orientation of the aircraft where and the anticipated time when the forecasted disturbance will exert pressure on the aircraft; (b) determine the anticipated effect of the forecasted pressure on the aircraft; (c) determine what changes to the states of the engines and control surfaces need to be implemented in order to at least partially counteract any adverse effects of the forecasted pressure when applied to the aircraft; and (d) generate commands for effecting the changes to the states of the engines and control surfaces determined in operation (c). The anticipated position of the aircraft at the anticipated time of arrival of wind gust pressure may be computed based on the current position, current speed and intended trajectory of the aircraft.

Pressure conversions are known calculations/equations based on speed, air density, etc. Wind blows from a high-pressure zone toward a low-pressure zone. In the discussion below setting forth example scenarios involving automated wind gust alleviation, wind speed should be understood in terms of relative velocity. Wind that blows against the aircraft (e.g., headwind) is treated herein as being a negative wind speed (positive pressure)—considering the aircraft as the reference point (0, 0, 0), relative to the motion of the aircraft, a headwind has a negative wind speed. Similarly, in terms of pressure, positive pressure refers to pressure towards the body of the aircraft—positive pressure is produced by forces pushing the aircraft in the wind direction, whereas negative pressure is produced by suction pulling the aircraft in the wind direction. When wind interacts with an aircraft, both positive and negative (i.e., suction) pressures occur simultaneously. As used herein, the term "negative pressure" means a pressure less than ambient pressure, and the term "positive pressure" means a pressure greater than ambient pressure.

The wind measurement units 84*a*-84*n* all measure wind properties (direction, speed). The wind speed and direction data is converted into disturbance information that includes pressure data. The disturbance information, including pressure data, is sent to the position control system 88, which incorporates one or more processors configured to enable the onboard real-time wind gust alleviation function proposed herein. Various examples of wind gust alleviation operations that may be employed during takeoff or landing of a V/STOL aircraft will now be described.

In a first example, assume that the objective is to hold the position and attitude of a hovering aircraft. Further assume that the wind measurement system 80 detects a spatially large (compared to aircraft size) gust with positive pressure. The impact of such a gust may cause the aircraft to pitch up at a leading edge of the gust, followed by excess vertical thrust, followed by pitch down at the trailing edge of the gust. In this case, the wind gust alleviation function is configured to issue control commands which produce a negative pitch correction, followed by uniformly reduced thrust, followed by a positive pitch correction. For example, first a pitch control surface is moved from a first position to a second position prior to the arrival of the leading edge of the gust and then the pitch control surface is moved from the second position back to the first position after the arrival of the leading edge and prior to the arrival of the trailing edge of the gust.

In a second example, assume that the objective is to hold the position and attitude of a hovering aircraft. Further assume that the wind measurement system 80 detects a spatially large (compared to aircraft size) gust with negative pressure. The impact of such a gust may cause the aircraft to pitch down at a leading edge of the gust, followed by deficit vertical thrust, followed by pitch up at the trailing edge of the gust. In this case, the wind gust alleviation function is configured to issue control commands which produce a positive pitch correction, followed by uniformly increased thrust, followed by a negative pitch correction.

In a third example, assume that the objective is to hold the attitude of an aircraft that is hovering well away from ground or obstacles. Further assume that the wind measurement system 80 detects a spatially large (compared to aircraft size) gust with positive pressure. The impact of such a gust may cause the aircraft to pitch up at a leading edge of the gust, followed by excess vertical thrust, followed by pitch down at the trailing edge of the gust. In this case, the wind gust alleviation function is configured to issue control commands which produce a negative pitch correction, followed by do nothing (since the aircraft is hovering well above ground or obstacle), followed by a positive pitch correction.

In a fourth example, assume that the objective is to hold the position and attitude of a hovering aircraft. Further assume that the wind measurement system 80 detects a spatially small (compared to aircraft size) gust, off-center to the aircraft's port side, with positive pressure. The impact of such a gust may cause the aircraft to positive roll with slight pitch up at the leading edge of the gust, followed by positive roll with slight pitch down at the trailing edge of the gust. In this case, the wind gust alleviation function is configured to issue control commands which produce a negative roll and negative pitch correction, followed by a negative roll and positive pitch correction.

In a fifth example, assume that the objective is to hold the position and attitude of a hovering aircraft. Further assume that the wind measurement system 80 detects a spatially small (compared to aircraft size) gust in a lateral dimension (meaning large in the axial dimension), off-center to the aircraft's port side, with positive pressure. The impact of such a gust may cause the aircraft to positive roll with slight pitch up at the leading edge of the gust, followed by positive roll with slight pitch down at the trailing edge of the gust. In this case, the wind gust alleviation function is configured to issue control commands which produce a negative roll and negative pitch correction, followed by negative roll correction, followed by negative roll and positive pitch correction.

While systems and methods for enabling consistent smooth takeoffs and landings of V/STOL aircraft at sites with gusty conditions have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein. The embodiments described in some detail above may include computer-executable instructions, such as routines executed by a programmable computer. Other computer system configurations may be employed, such as a special-purpose computer or a data processor that is specifically programmed, configured, or constructed to perform one or more of the computer-executable instructions described below. Accordingly, the term "computer" as generally used herein refers to any data processor that can be engaged in a cockpit, including computers for cockpit display systems, flight management computers, flight control computers, electronic flight bags, laptops, laptops, or other hand-held devices.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for augmenting takeoff and landing stability of an aircraft, the method comprising: (a) measuring wind gusts in a volume of airspace overlying a takeoff/landing zone using a multiplicity of wind measurement units spaced along a perimeter of the takeoff/landing zone and oriented to measure wind speed and direction along respective vertical lines projecting upward from the wind measurement units, wherein the aircraft is being maneuvered vertically in the volume of airspace overlying the takeoff/landing zone; (b) converting wind gust measurements acquired by the wind measurement units into disturbance information, using a wind measurement computer system, identifying a localized disturbance projected to encounter the aircraft; (c) transmitting the disturbance information from the wind measurement computer system to a flight controller of the aircraft; (d) generating commands for controlling the aircraft in a manner that, at least partially, counteracts an impact of the localized disturbance on the aircraft in the volume of airspace; and (e) controlling the aircraft in accordance with the commands generated in step (d), wherein step (b) comprises processing the wind gust measurements to determine the speed and direction of any wind that enters or leaves the volume of airspace at an elevation higher than the elevation of the wind measurement unit, computing an anticipated position and orientation of the aircraft where and an anticipated time when a forecasted disturbance will exert pressure on the aircraft, determining an anticipated effect of a forecasted pressure on the aircraft, and determining what changes to states of engines and control surfaces need to be implemented in order to at least partially counteract any adverse effects of the forecasted pressure when applied to the aircraft; and wherein step (d) comprises generating commands for effecting the changes to the states of the engines and control surfaces determined in step (b).

2. The method as recited in claim 1, wherein step (e) comprises adjusting control surfaces in accordance with the commands generated in the flight controller.

3. The method as recited in claim 1, wherein the localized disturbance is identified based on a fluctuation in pressure surrounding the aircraft.

4. The method as recited in claim 1, wherein step (e) comprises moving a control surface from a first position to a second position prior to the arrival of a leading edge of a gust and then moving the control surface from the second position back to the first position after the arrival of the leading edge and prior to the arrival of a trailing edge of the gust.

5. The method as recited in claim 4, wherein measuring wind gusts comprises measuring wind speed and wind direction along respective vertical lines projecting upward from the wind measurement units.

6. A system for augmenting takeoff and landing stability of an aircraft in a volume of airspace overlying a takeoff/landing zone, the system comprising: a multiplicity of wind measurement units spaced along a perimeter of the takeoff/landing zone and oriented to measure wind speed and direction along respective vertical lines projecting upward from the wind measurement units; a wind measurement computer system configured to convert wind gust measurements acquired by the wind measurement units into disturbance information identifying a localized disturbance projected to encounter the aircraft within the volume of airspace; and a flight controller onboard the aircraft which is communicatively coupled to the wind measurement computer system and configured for generating commands based on the disturbance information for controlling the aircraft in a manner that, at least partially, counteracts an impact of the localized disturbance on the aircraft, and then controlling the aircraft in accordance with the commands, wherein converting wind gust measurements into disturbance information comprises processing the wind gust measurements to determine the speed and direction of any wind that enters or leaves the volume of airspace at an elevation higher than the elevation of the wind measurement unit, computing an anticipated position and orientation of the aircraft where and an anticipated time when a forecasted disturbance will exert pressure on the aircraft, determining an anticipated effect of a forecasted pressure on the aircraft, and determining what changes to states of engines and control surfaces need to be implemented in order to at least partially counteract any adverse effects of the forecasted pressure when applied to the aircraft; and wherein the generated commands effect changes to states of engines and control surfaces.

7. The system as recited in claim 6, wherein the wind measurement computer system is on the ground.

8. The system as recited in claim 6, wherein the wind measurement computer system is onboard the aircraft.

9. A method for augmenting takeoff and landing stability of an aircraft, the method comprising: (a) measuring wind gusts that form in a volume of airspace overlying a zone adjacent a runway threshold using a multiplicity of wind measurement units which are spaced along a perimeter of the zone adjacent the runway threshold and oriented to measure wind speed and direction along respective vertical lines projecting upward from the wind measurement units, wherein the aircraft is being maneuvered along a path in the volume of airspace; (b) converting wind gust measurements acquired by the wind measurement units into disturbance information identifying a localized disturbance projected to encounter the aircraft along the path, using a wind measurement computer system on the ground or onboard the aircraft; (c) transmitting the disturbance information from the wind measurement computer system to a flight controller onboard the aircraft; (d) generating commands for controlling the aircraft in a manner that, at least partially, counteracts an impact of the localized disturbance on the aircraft along the path; and (e) controlling the aircraft at the predicted time of arrival in accordance with the commands generated in step (d), wherein step (b) comprises processing the wind gust measurements to determine the speed and direction of any wind that enters or leaves the volume of airspace at an elevation higher than the elevation of the wind measurement unit, computing an anticipated position and orientation of the aircraft where and an anticipated time when a forecasted disturbance will exert pressure on the aircraft, determining an anticipated effect of a forecasted pressure on the aircraft, and determining what changes to states of engines and control surfaces need to be implemented in order to at least partially counteract any adverse effects of the forecasted pressure when applied to the aircraft; and wherein step (d) comprises generating commands for effecting the changes to the states of the engines and control surfaces determined in step (b).

10. The method as recited in claim 9, wherein step (f) comprises adjusting control surfaces in accordance with the commands generated in the flight controller.

11. The method as recited in claim 9, wherein the localized disturbance is identified by a predicted time of arrival of a fluctuation in pressure.

12. The method as recited in claim 9, wherein step (f) comprises moving a control surface from a first position to a second position prior to the arrival of a leading edge of a gust and then moving the control surface from the second position back to the first position after the arrival of the leading edge and prior to the arrival of a trailing edge of the gust.

13. The method as recited in claim 9, wherein the wind measurement units are spaced along a perimeter of the zone adjacent the runway threshold.

14. The method as recited in claim 13, wherein measuring wind gusts comprises measuring wind speed and wind direction along respective vertical zone upward from the wind measurement units.

15. A system for augmenting takeoff and landing stability of an aircraft in a volume of airspace overlying a zone adjacent a runway threshold, the system comprising: a multiplicity of wind measurement units spaced along a perimeter of the zone adjacent the runway threshold and oriented to measure wind speed and direction along respective vertical lines projecting upward from the wind measurement units; a wind measurement computer system configured to convert wind gust measurements acquired by the wind measurement units into disturbance information identifying a localized disturbance projected to encounter the aircraft within the volume of airspace; a flight controller onboard the aircraft which is communicatively coupled to the wind measurement computer system and configured for generating commands based on the disturbance information for controlling the aircraft in a manner that, at least partially, counteracts an impact of the localized disturbance on the aircraft, and then controlling the aircraft in accordance with the commands, wherein converting wind gust measurements into disturbance information comprises processing the wind gust measurements to determine the speed and direction of any wind that enters or leaves the volume of airspace at an elevation higher than the elevation of the wind measurement unit, computing an anticipated position and orientation of the aircraft where and an anticipated time when a forecasted disturbance will exert pressure on the aircraft, determining an anticipated effect of a forecasted pressure on the aircraft, and determining what changes to states of engines and control surfaces need to be implemented in order to at least partially counteract any adverse effects of the forecasted pressure when applied to the aircraft; and wherein the generated commands effect changes to states of engines and control surfaces.

16. The system as recited in claim 15, wherein the localized disturbance is identified based on a fluctuation in pressure surrounding the aircraft measured by the wind measurement units.

17. The system as recited in claim 6, wherein the wind measurement units are laser Doppler anemometers.

18. The system as recited in claim 6, wherein the wind measurement units are sound detection and ranging systems.

19. The system as recited in claim 15, wherein the wind measurement units are laser Doppler anemometers.

20. The system as recited in claim 15, wherein the wind measurement units are sound detection and ranging systems.

* * * * *